Feb. 12, 1924. 1,483,455
H. P. KRAFT
PIPE COUPLING
Filed Aug. 3, 1921
Fig. 1.
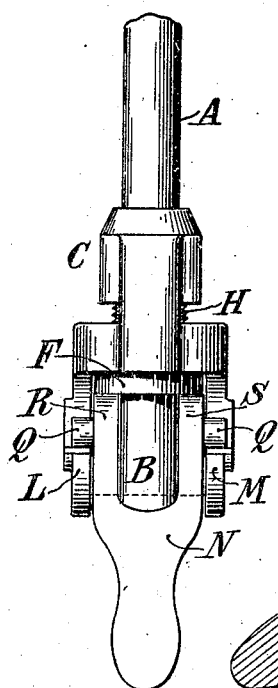
Fig. 2.
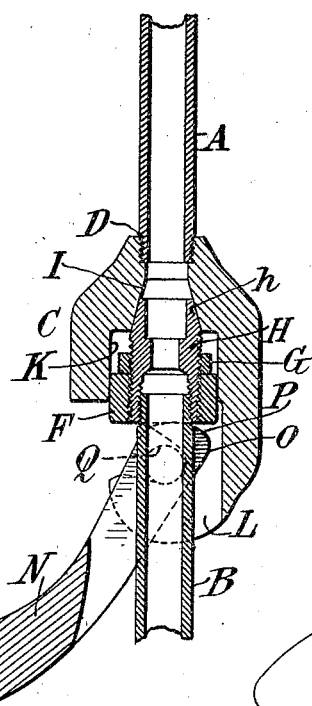
Fig. 3.
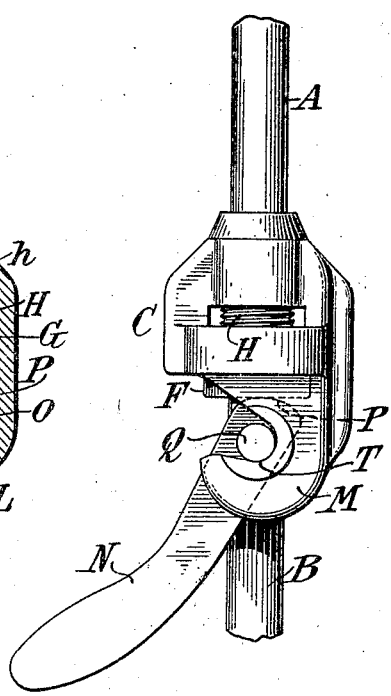
Fig. 4.
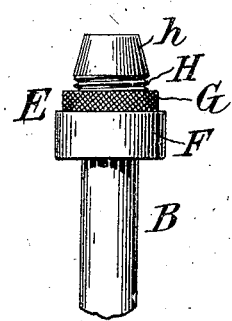
Fig. 5.
Fig. 6.
Fig. 7. Fig. 9.
Fig. 8. Fig. 10.
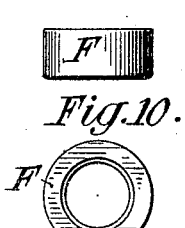
Inventor
Henry Phillip Kraft,
By his Attorneys
Fraser Turk & Myers Patented Feb. 12, 1924.

1,483,455

UNITED STATES PATENT OFFICE.

HENRY P. KRAFT, OF RIDGEWOOD, NEW JERSEY.

PIPE COUPLING.

Application filed August 3, 1921. Serial No. 489,445.

*To all whom it may concern:*

Be it known that I, HENRY P. KRAFT, a citizen of the United States of America, residing in Ridgewood, in the county of Bergen and State of New Jersey, have invented certain new and useful Improvements in Pipe Couplings, of which the following is a specification.

This invention relates to pipe couplings and aims to provide certain improvements therein. More particularly it relates to pipe coupling used in vulcanizing certain types of tire casings, wherein means are provided for coupling short lengths of pipe to produce a continuous pipe for carrying vulcanizing fluids. In such apparatus it is very desirable to provide a coupling device which will be very easily operated to couple and uncouple such pipes and which will provide a steam tight joint when in the coupled position. As the space is restricted it is also desirable that the coupling device shall be as compact as possible. A pipe coupling of this type is disclosed in my earlier-filed application, Serial No. 380,025, filed May 10, 1920. The present invention constitutes an improvement over said earlier-filed application, in that means are provided for compensating wear on the coupled parts which ultimately results in causing the steam tight joint to become imperfect. Accordingly, it is an important object of the present invention to provide a coupling device in which an absolute steam tight connection with the coupled parts can be always maintained throughout the life of the coupling.

In the drawing wherein I have illustrated a coupling which embodies the preferred form of the present invention,—

Figure 1 is an elevation of the coupling.

Fig. 2 is a vertical section taken at right angles to Fig. 1.

Fig. 3 is an elevation of the coupling viewing it at right angles to Fig. 1.

Fig. 4 is an elevation of one of the lengths of pipe.

Figs. 5 and 6, Figs. 7 and 8, and Figs. 9 and 10, respectively, are side elevations and plans of detail parts of the invention.

Referring to the drawings, let A indicate one length of pipe which it is desired to couple to another length B. The pipe A is clearly shown in Figs. 1, 2 and 3, and the pipe B is also shown in these figures, but more clearly in Fig. 4 wherein it is illustrated as detached. These pipes are suitably connected with a steam line and molds in a manner which need not be described.

To the pipe A is connected the main coupling device C as by screwing the coupling device on the end of the pipe, as is best illustrated at D in Fig. 2. The pipe B is provided with a head E which comprises generally a collar F, a lock nut G and a sleeve H, provided with a tapered seating face *h*, the functions of which will be hereinafter more fully set forth. This tapered seating face is adapted to enter a tapered recess or seat I on the interior of the coupling C. Preferably, the coupling C is provided with a cylindrical recess K within which the collar F of the pipe B fits snugly, thus guiding the tapered face *h* into the seat I, as best seen in Fig. 2. It is to be understood, however, that the collar F and lock nut G may be provided with wrench engaging surfaces so that a more secure locking engagement between said parts may be obtained if desired without sacrificing the guiding function of the collar.

Means are provided for forcing the tapered seating face *h* into its seat under considerable pressure. To accomplish this according to the present invention, I provide the coupling C with two arms L and M respectively, which are separated to permit the pipe B to pass between them. These arms comprise re-action members which are designed to receive the thrust of a lever or cam device N, the short end O of which bears against the head E and forces the latter upwardly to couple the parts together. The short end O of the lever N is preferably made with a cam surface P, whereby a still greater application of force may be made against the head E. The fulcrum of the lever N is preferably a pin Q which engages the arms L and M, as best seen in Fig. 3.

Preferably, the lever N is slotted to form two arms R and S, as best seen in Fig. 1, the arms straddling the pipe B as shown. In this case the pivoted pin Q will be formed in two parts so as to avoid interference with the pipe, as best seen in Fig. 1.

In order to facilitate the introduction of the pipe B into the coupling, I prefer to make the lever N removable from the coupling, and for this purpose the arms L and M are best formed as hooks, open on one side and provided with bearing faces T on which the pivots Q are designed to rest and turn. By this construction the lever N may be completely removed, thus leaving the coupling freely open to receive the pipe B and permitting ease of insertion of the head E in place within the coupling. When this has been accomplished, the lever N is then positioned in place and swung downwardly, thereby forcing the pipe B upwardly into leak tight engagement with the pipe A by engaging the under side of the head E.

In practice it has been found that after considerable use of the coupling device the engaging cam surface P and the surface constituting the under side of the head E are subjected to wear resulting in an imperfect seal between the tapered seat I and the tapered face h of the head E. To overcome this deficiency, I form the head E adjustable on the pipe B, so that the wear on the parts may be compensated for by proper adjustment. By this adjustment the cam surface P and the under side of the head E can always be made to contact and co-act to force the tapered seating faces into engagement.

To provide for this compensation, the head E comprises parts F, G and H. The sleeve H is screw-threadedly mounted on the pipe B and thus forms a continuation thereof. The collar F is screw-threadedly mounted on the exterior of the sleeve H, and adapted to be held in any fixed position thereon by the knurled lock nut G, which likewise is screw-threadedly mounted on said collar.

From the foregoing description it will be seen that as wear takes place on the cam surface P and the under side of the collar F, said collar F may be adjusted downwardly and held in its adjusted position by the lock nut G, thus insuring the application of sufficient pressure by the lever N to the head E for the purpose described.

The invention provides a very simple and convenient coupling device which is especially applicable for vulcanizing presses of the type referred to and by means of which coupling operations may be very quickly and conveniently performed without loss of time and with a certainty of leak tight connections being secured.

While I have shown and described one form of the invention, it will be understood that I do not wish to be limited thereto, since various changes may be made therein without departing from the spirit of the invention.

What I claim is:—

1. A coupling of the type described comprising two sections, one provided with a seat and the other with a head adapted to contact with said seat, said seat and head having non-compressible seating faces, a lever associated with one of said sections and operable to engage the other section to force the head and seat into locking contact, one of said sections being adjustable to compensate for wear on the lever and the engaging surface on the section.

2. A coupling of the type described comprising two sections, one provided with a seat and the other with a head adapted to contact with said seat, said seat and head having non-compressible seating faces, a lever associated with the seat-carrying section and operable to engage the head-carrying section to force the head into locking contact with the seat, the head on the head-carrying section being adjustable to compensate for wear on the lever and the engaging surface on said section.

3. A coupling of the type described comprising two sections, one provided with a seat and the other with a head adapted to contact with said seat, said seat and head having non-compressible seating faces, a lever associated with the seat-carrying section and operable to engage the head on the other section to force it into locking contact with the seat, the head being adjustable to compensate for wear on the engaging surfaces of the head and lever.

4. A coupling of the type described having a tapered seat, a pipe having a tapered head adapted to enter said seat, a pair of arms carried by the seat member between which said pipe and head are adapted to longitudinally pass, a cam lever pivotally mounted on said arms and adapted to engage said head to force the same into said seat, the head being longitudinally adjustable on the pipe.

5. A coupling of the type described having a member formed with a seat, a pipe having a head longitudinally adjustable thereon and adapted to engage said seat, said head comprising a sleeve provided with an end seating face, a collar threadedly mounted on said sleeve and a lock nut for said collar, said head being adapted to be forced into contact with said seat by a cam lever carried by the seat member.

6. A coupling of the type described having a tapered seat, a cylindrical recess in advance of said seat, a pipe having a tapered head longitudinally adjustable thereon and adapted to enter said seat, said head comprising a sleeve provided with a tapered end face, a cylindrical collar adapted to enter said cylindrical recess threadedly mounted on said sleeve and a lock nut for said collar, said head being adapted to be forced into contact with said tapered seat by a cam lever carried by the coupling.

In witness whereof I have hereunto signed my name.

HENRY P. KRAFT.